United States Patent Office 3,439,047
Patented Apr. 15, 1969

3,439,047
DERIVATIVES OF 2,2'-DIHYDROXY, 3,3'-DI-
METHYLDIPHENYLMETHANE AND PROC-
ESS FOR PREPARING SAME
Frank P. Florentine, Jr., Pittsfield, Mass., assignor to
General Electric Company, a corporation of New
York
No Drawing. Filed Sept. 27, 1965, Ser. No. 490,663
Int. Cl. C07c 37/20, 91/44, 39/12
U.S. Cl. 260—619                                    1 Claim

ABSTRACT OF THE DISCLOSURE

A dimethylol or diamino derivative of a compound having the following formula:

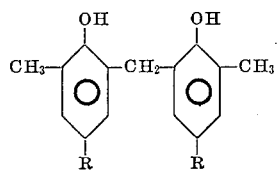

The above formula is either a methylol group —$CH_2OH$ or an amino group, or mixtures thereof. In addition, it is directed to a process for preparing 2,2'-dihydroxy-3,3'-dimethyldiphenylmethane, which process consists of heating o-cresol in the presence of 0.3–5.0 weight percent of an alkaline catalyst such as calcium hydroxide at a temperature of at least 120° C. and then adding a formaldehyde source. In addition, this is also directed to a process for preparing the dimethylol or diamino derivatives of 2,2'-dihydroxy-3,3'-dimethyldiphenylmethane by reacting the intermediate thereof with an excess of formaldehyde at a temperature of at least 60° C. This is then followed by cooling the reaction to room temperature in order to solidify the composition as set forth above.

---

This invention is directed to a new and novel product and in particular to a process for preparing the new and novel product which product is a particular derivative of a dihydroxy-dimethyldiphenylmethane. More particularly, the derivative is either the amine or methylol derivative of 2,2'-dihydroxy-3,3'-dimethyldiphenylmethane.

In the area of thermosetting resins, there are many well known additives that are useful in imparting certain properties to thermosetting resins when such resins are advanced to the infusible state. The property of flexibility in an infusible thermoset resin is very much desired. Many attempts have been made to obtain this property by the use of various additives. However, these additives have the drawback of adversely affecting the other desirable properties of the resin such as bonding strength, rate of cure, etc. It has now been discovered that a new and useful derivative of 2,2'-dihydroxy-3,3'-dimethyldiphenylmethane imparts certain beneficial properties such as flexibility when employed as an additive with thermosetting resins of the phenol formaldehyde type. 2,2'-dihydroxy-3,3'-dimethyldiphenylmethane from which the new and useful product of this invention can be prepared.

Therefore it is an object of this invention to provide a new and novel composition.

It is a further object of this invention to provide a process for preparing the new and novel compound.

Other objects and advantages of this invention will become apparent from the following detailed description thereof.

Briefly, according to this invention the foregoing and other objects are attained by reacting 2,2'-dihydroxy-3,3'-dimethyldiphenylmethane with certain materials to produce particular derivatives thereof.

The following examples are set forth to illustrate more clearly the principle and practice of this invention to those skilled in the art. Unless otherwise specified, where parts or percentages are mentioned, they are parts or percentages by weight.

Example I

To a reaction kettle fitted with an agitator and a reflux condenser, 300 parts of water and 10 grams of a 35% sodium hydroxide solution are added. Nitrogen is bubbled through the solution while agitating for about 30 minutes. Twenty (20) parts of 2,2'-dihydroxy-3,3'-dimethyldiphenylmethane are added. The 2,2'-dihydroxy-3,3'-dimethyldiphenylmethane readily dissolves to form a solution. The solution is heated to about 75° C. To the solution is then added 22 parts of formalin (37% formaldehyde). The solution is maintained at about 75° C. for approximately 2 hours while agitating.

The solution is then cooled to room temperature and neutralized by passing carbon dioxide gas through the solution until a pH of about 7 is obtained. The resulting precipitate is the dimethylol derivative of 2,2'-dihydroxy-3,3'-dimethyldiphenylmethane.

Example II

Example I is repeated except that in place of the formaldehyde being reacted with the 2,2'-dihydroxy-3,3'-dimethyldiphenylmethane, dilute nitric acid (10%) is reacted therewith at room temperature for about 24 hours. A slurry forms. The slurry is neutralized with sodium hydroxide to a pH of about 8. The slurry is allowed to settle. It is filtered and washed with ethanol. The material is dried and is the dinitro derivative of 2,2'-dihydroxy-3,3'-dimethyldiphenylmethane. The solid product is dissolved in ethanol and reduced with hydrochloric acid and iron. The resulting product is essentially the diamino derivative of 2,2'-dihydroxy-3,3'-dimethyldiphenylmethane.

This invention is directed to a new and novel compound which novel compound is a particular derivative of 2,2'-dihydroxy-3,3'-dimethyldiphenylmethane. The new and novel compound of this invention corresponds to the following formula:

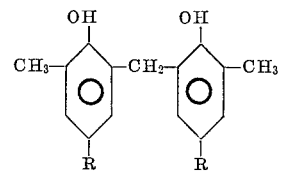

wherein R in the above formula is selected from the group consisting of an amino group and methylol group —$CH_2OH$. A critical feature of the compound is that R is selected from one of the above groups. Preferably in the practice of this invention R is the methylol —$CH_2OH$.

The new and novel composition of this invention is prepared by reacting 2,2'-dihydroxy-3,3'-dimethyldiphenylmethane intermediate with either formaldehyde to form the methylol derivative thereof or nitric acid followed by reduction of the nitrate groups to form the amino groups.

In another embodiment of this invention, the intermediate product, 2,2'-dihydroxy-3,3'-dimethyldiphenylmethane or the derivatives thereof may be neutralized to a pH of about 7 with such material as carbon dioxide, lactic acid etc. When so neutralizing, a light colored product is obtained. However, in the practice of this invention, it is not necessary to neutralize the reaction.

The compounds of this invention and in particular the dimethylol derivative of the 2,2'-dihydroxy-3,3'-dimethyl-diphenylmethane has extensive use in many applications. For example, is can be used as a curing agent for epoxy resins, as a curing agent for phenolic resins of the two-stage and one-stage type, or it can be used as an additive for laminating varnishes, or as a plasticizer for phenolic resins. In addition, the novel compounds of this invention can be advaced to a thermoset state by usig a novolac as a curing agent. In particular it is believed that the compounds of this invention can also impart flexibility to phenolic treated paper by a process of first treating the paper with a solution of the compound of this invention, drying the treated paper and then treating the paper with a phenolic varnish. A laminate prepared from an assembly of these treated papers will be found to have excellent cold punching properties. The type of varnish employed for treating the paper is of the type designated as XXX–p cold punch varnishes, which varnishes are phenol-formaldehyde resins in an organic solvent containing certain additives. Some of the additives employed can be a vegetable oil, styrenated phenols or other materials or mixtures thereof, which materials tend to produce flexibility. However, the added advantage of employing the above procedure is that the treated paper remains flexible because of the prior coating with the compound of this invention as contrasted with the self-curing phenolic resins normally used. As stated above, the two-stage and one-stage resins are defined as those materials produced by reacting less than 1 mole of an aldehyde per mole of phenol (two-stage resin) which requires an external cross-linking agent in order to be advanced to an infusible state upon exposure to elevated temperatures, or by reacting more than 1 mole of an aldehyde per mole of phenol (one-stage) which requires only exposure of the resin to elevated temperatures in order to be advanced to an infusible state.

It will thus be seen that the objects set forth above among those made apparent from the preceding description, are efficiently attained, and since certain changes may be made in carrying out the above process and in the composition set forth without departing from the scope of the invention that all matters attained in the above description shall be interpreted as illustrative and not in a limiting sense.

What is claimed is:

1. A compound having the formula

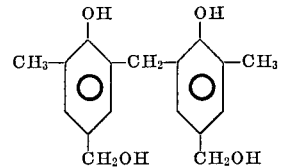

References Cited

UNITED STATES PATENTS 2,754,335  7/1956  Bender et al.

FOREIGN PATENTS 928,169  6/1963  Great Britain.

OTHER REFERENCES

Fraser et al.: Jour. Applied Chem. 7, pp. 676–689 (1957).

LEON ZITVER, *Primary Examiner.*

N. MORGENSTERN, *Assistant Examiner.*

U.S. Cl. X.R.

162—165; 260—33.4, 570, 607

U.S. DEPARTMENT OF COMMERCE
PATENT OFFICE
Washington, D.C. 20231

UNITED STATES PATENT OFFICE
CERTIFICATE OF CORRECTION

Patent No. 3,439,047                        April 15,

Frank P. Florentine, Jr.

It is certified that error appears in the above identified patent and that said Letters Patent are hereby corrected as shown below:

Column 1, lines 61 to 63, cancel "2,2'-dihydroxy-3,3'-dimethyldipheny methane from which the new and useful product of this invention can be prepared.". Column 3, line 4, "is" should read -- it --; line 9, "advaced should read -- advanced --; same line 9, "usig" should read -- using --.

Signed and sealed this 14th day of April 1970.

(SEAL)
Attest:

Edward M. Fletcher, Jr.                      WILLIAM E. SCHUYLER, J

Attesting Officer                             Commissioner of Paten